(12) United States Patent
Kumaran et al.

(10) Patent No.: US 9,727,819 B2
(45) Date of Patent: Aug. 8, 2017

(54) INTEGRATING RULE BASED SYSTEMS WITH DISTRIBUTED DATA PROCESSING BY PUSHING CONTROL TO EDGE AGENTS

(71) Applicant: Cisco Technology, Inc., San Jose, CA (US)

(72) Inventors: Vikram Kumaran, Cary, NC (US); Saileshwar Krishnamurthy, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 422 days.

(21) Appl. No.: 14/563,111

(22) Filed: Dec. 8, 2014

(65) Prior Publication Data
US 2016/0162787 A1 Jun. 9, 2016

(51) Int. Cl.
  *G06N 5/04* (2006.01)
  *G06N 5/02* (2006.01)
  *G06F 17/30* (2006.01)

(52) U.S. Cl.
  CPC ....... *G06N 5/025* (2013.01); *G06F 17/30395* (2013.01); *G06F 17/30557* (2013.01)

(58) Field of Classification Search
  CPC .............. G06N 5/025; G06F 17/30395; G06F 17/30557
  USPC .......................................................... 706/47
  See application file for complete search history.

(56) References Cited

U.S. PATENT DOCUMENTS 9,171,079 B2 * 10/2015 Banka ............... G06F 17/30864
9,484,243 B2 * 11/2016 Larson ................ H01L 21/6719

OTHER PUBLICATIONS

Gurgen et al., "A Scalable Architecture for Heterogeneous Sensor Management", Sixteen International Workshop on Database and Expert Systems Applications, Sep. 19, 2005, IEEE Computer Society.*

(Continued)

*Primary Examiner* — Stanley K Hill
*Assistant Examiner* — Tsu-Chang Lee
(74) *Attorney, Agent, or Firm* — Hickman Palermo Becker Bingham LLP

(57) ABSTRACT

In an embodiment, an improved computer-implemented method of efficiently determining actions to perform based on data from a streaming continuous queries in a distributed computer system comprises, at a central control computer, receiving a streaming continuous query and a rule-set; wherein the rule-set comprises decision data representing decisions based on attributes produced by the query, and action data representing end actions based on the decisions, wherein the attributes comprise data processed by one or more networked computers; separating the streaming continuous query into a sub-query executable at one or more edge computers; categorizing end actions from the set based on decisions requiring attributes available from the sub-query into a set of one or more edge expressions that are configured to be evaluated at an edge agent to cause an action; providing the set of edge expressions and the sub-query to at least one edge computer with instructions to process visible attributes on the edge computer and to evaluate the set of one or more edge expressions independently from the central control computer; wherein the method is performed by one or more computing devices.

20 Claims, 14 Drawing Sheets

(56) References Cited

OTHER PUBLICATIONS

Zhou et al., "An adaptable distributed query processing architecture", Data & Knowledge Engineering 53 (2005)283-309, Elsevier B.V.*
Aref, et al, "Lana-Match algorithm: a parallel version of the Rete-Match aqlgorithm", Parallel Computing 24 (1998)763-775, Elsevier B.V.*
Jacopo Urbani, et al., "Scalable Distributed Reasoning Using MapReduce", Dept. of Computer Science, Vrije Universiteit Amsterdam, the Netherlands; pp. 1-16; The Semantic Web—ISWC 2009.
Costin Badica, et al.; "Rule-Based Distributed and Agent Systems"; link.springer.com under in N. Bassiliades et al. (Eds.): RuleML 2011—Europe, LNCS 6826, pp. 3-28, 2011. (c) Springer-Verlag Berlin Heidelberg 2011.

* cited by examiner

501
Conjunctive Form

503
If (Decision 203 AND Decision 205) => Local Action 209

505
If (Decision 203 AND Decision 205) => Local Action 211

507
If (Decision 203 AND Decision 207) => Local Action 213

509
If (Decision 203 AND Decision 207) =>Remote Action 215

511
Disjunctive Normal Form

513
If (Decision 203 AND Decision 205) OR
(Decision 203 & Decision 207) => Local Action 209, 213 (same action)

515
If (Decision 203 AND Decision 205) => Local Action 211

517
If (Decision 203 & Decision 207) =>Remote Action 215

FIG. 5A

551
Conjunctive Form

553
If (speed > 45 253 AND moisture > 30% 255) => Cruise Off 259

555
If (speed > 45 253 AND moisture > 30% 255) => Wiper On 261

557
If (speed > 45 253 AND ncars > 500 257) => Cruise Off 259

559
If (speed > 45 253 AND ncars > 500 257) =>Metering On 265

561
Disjunctive Normal Form

563
If (speed > 45 253 AND moisture > 30% 255) OR
(speed > 45 253 AND ncars > 500 257) =>Cruise Off 259

565
If (speed > 45 253 AND moisture > 30% 255) => Wiper On 261

567
If (speed > 45 253 AND ncars > 500 257) =>Metering On 265

FIG. 5B

601
Rule Categorization

603
Categorize
Rule 565 

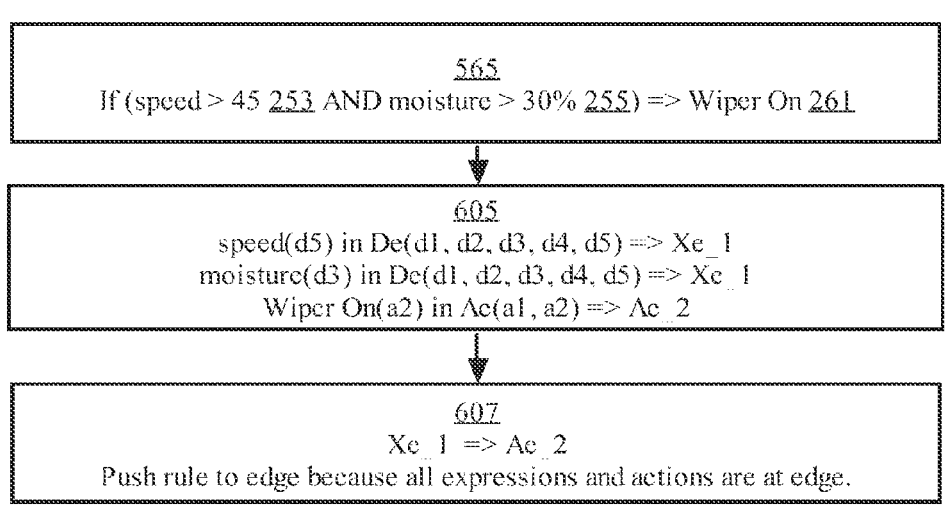

565
If (speed > 45 253 AND moisture > 30% 255) => Wiper On 261

605
speed(d5) in De(d1, d2, d3, d4, d5) => Xe_1
moisture(d3) in De(d1, d2, d3, d4, d5) => Xe_1
Wiper On(a2) in Ac(a1, a2) => Ac_2

607
Xe_1 => Ac_2
Push rule to edge because all expressions and actions are at edge.

609
Categorize
Rule 567 

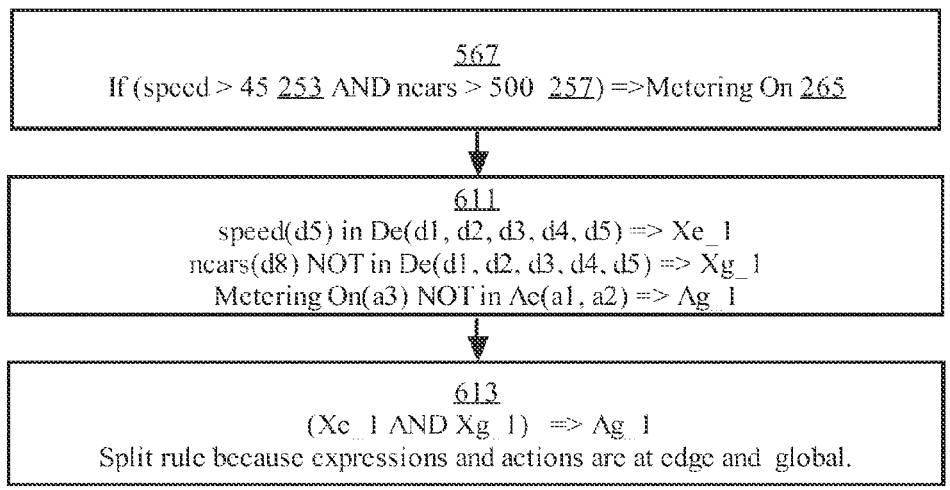

567
If (speed > 45 253 AND ncars > 500 257) =>Metering On 265

611
speed(d5) in De(d1, d2, d3, d4, d5) => Xe_1
ncars(d8) NOT in De(d1, d2, d3, d4, d5) => Xg_1
Metering On(a3) NOT in Ac(a1, a2) => Ag_1

613
(Xe_1 AND Xg_1) => Ag_1
Split rule because expressions and actions are at edge and global.

FIG. 6

INTEGRATING RULE BASED SYSTEMS WITH DISTRIBUTED DATA PROCESSING BY PUSHING CONTROL TO EDGE AGENTS

FIELD OF THE DISCLOSURE

The present disclosure relates to distributed computer control systems and, more specifically, to improved computer implemented techniques relating to integrating rule based computer systems with other data processing systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A control system is a device, or set of devices, that manages or regulates the behavior of other devices or systems. The devices and systems may be computers or networks. Control of the system may involve processing data and executing actions within a centralized control manager.

While this centralized model may work well with a local sensor network located within a data center, the model has serious flaws when placed in a poorly connected wide area network. In a wide area network, any computer may be defined as a control manager, but programming the connected devices to perform as agents may be difficult because of poor accessibility and scalability.

In addition, unreliable network connectivity, variable latency across the network, dynamic changes to the number of sensors, geographic distribution of sensors, changes to rule sets, and availability of nodes on the network also may cause problems.

Using rule based multi-agent systems, a set of preconfigured agents to execute hard coded rules and algorithms may be required but pre-configured policies for each node before a system can function would cause the system to fail because of the unreliable network connectivity of the wide area networks.

BRIEF DESCRIPTION OF THE DRAWINGS

In the drawings:

FIG. 5A is a block diagram illustrating the decision tree from FIG. 2A expressed in conjunctive and disjunctive normal form based on each path through the decision tree.

FIG. 5B is a block diagram illustrating the decision tree from FIG. 2B expressed in conjunctive and disjunctive normal form based on each path through the decision tree.

FIG. 6 is a flowchart illustrating categorizing rules from FIG. 5B as edge expressions and partial edge expressions.

DETAILED DESCRIPTION

Figure 1:
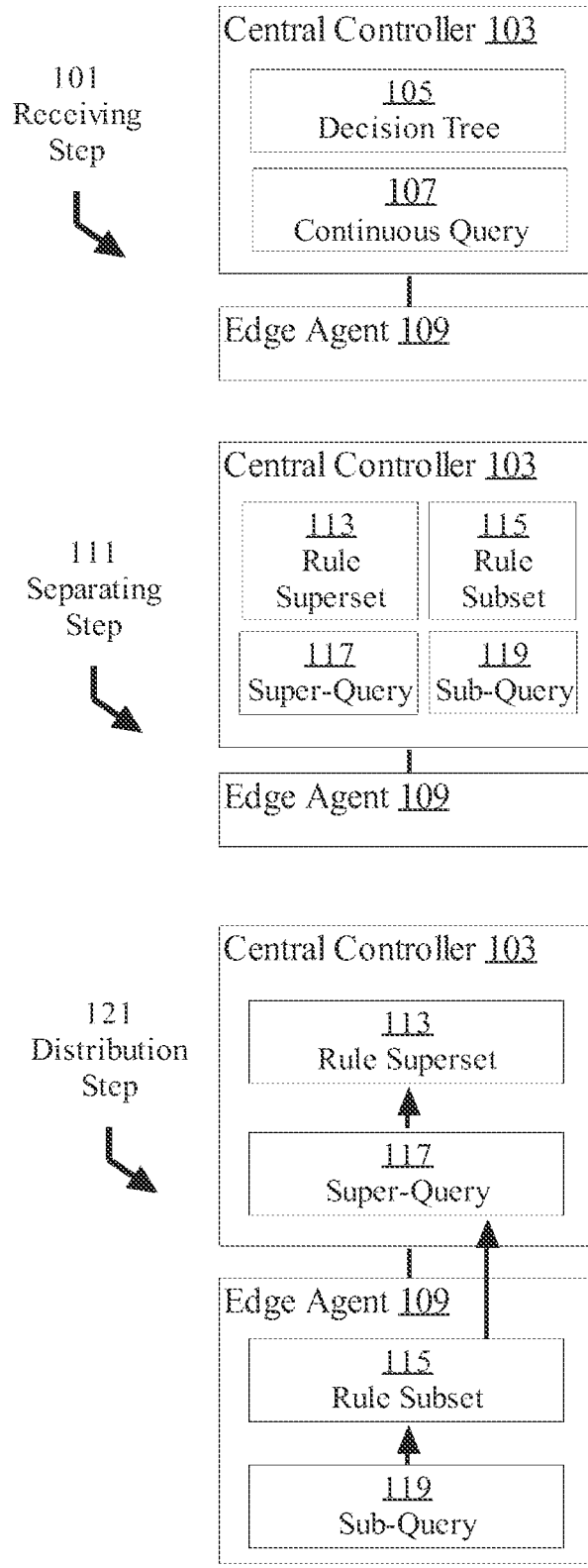
FIG. 1 is a block diagram illustrating an example high level program flow of transforming a loosely coupled continuous query and rule set, and interweaving them into a tightly coupled system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In an embodiment, an improved computer-implemented method of efficiently determining actions to perform based on data from a streaming continuous queries in a distributed computer system comprises, at a central control computer, receiving a streaming continuous query and a rule-set; wherein the rule-set comprises decision data representing decisions based on attributes produced by the query, and action data representing end actions based on the decisions, wherein the attributes comprise data processed by one or more networked computers; separating the streaming continuous query into a sub-query executable at one or more edge computers; categorizing end actions from the set based on decisions requiring attributes available from the sub-query into a set of one or more edge expressions that are configured to be evaluated at an edge agent to cause an action; providing the set of edge expressions and the sub-query to at least one edge computer with instructions to process visible attributes on the edge computer and to evaluate the set of one or more edge expressions independently from the central control computer; wherein the method is performed by one or more computing devices.

In an embodiment, a data processing system comprises a controller computer, coupled to one or more edge computers; at least one edge computer, wherein the controller computer receives a streaming continuous query and a rule-set; wherein the rule-set comprises decisions based on attributes produced by the query, and end actions based on the decisions, wherein the attributes comprise data processed by one or more computers on a network; separates the streaming continuous query into a sub-query executable at one or more edge computers; categorizes end actions from the set based on decisions requiring attributes available from the sub-query into a set of one or more edge expressions evaluable at an edge agent to cause an action; provides the set of one or more edge expressions and the sub-query to at least one edge computer to enable processing of visible attributes on the edge computer and evaluation of an action independently from the controller computer.

In an embodiment, a data processing system comprises a controller computer, coupled to one or more intermediate computers; an intermediate computer, coupled to one or more lower tiered computers; at least one edge computer, wherein the controller computer receives a streaming continuous query and a rule-set; wherein the rule-set comprises decisions based on attributes produced by the query, and end actions based on the decisions, wherein the attributes comprise data processed by one or more computers on a network; separates the streaming continuous query into a sub-query executable at the intermediate computer; categorizes end actions from the set based on decisions requiring attributes available from the sub-query into a set of one or more edge expressions evaluable at the intermediate computer to cause an action; provides the set of one or more edge expressions and the sub-query to at least one intermediate computer to enable processing of visible attributes on the intermediate computer and evaluation of an action independently from the controller computer.

In some embodiments, a method and apparatus providing distributed control systems fulfill requirements such as low latency and reliable network connectivity. Because wide area networks have unreliable network connectivity, high latency, and multiple computers entering and leaving the network, a system and method are provided for integrating rule based systems with the distributed data processing system into sub systems and pushing these tightly coupled sub-systems to edge agents, while maintaining some global rules and data processing queries at higher level system.

Streaming Continuous Query

Data processing systems and rule based processing systems typically operate as two separate systems across a network of computers; each system treats the other system as a black box. By interweaving these systems into tightly coupled subsystems, a subsystem may be pushed out from a central controller to a single computer. Benefits of this operation include reducing the amount of data transferred across the network, lowering the latency associated with raw data eventually triggering an action, and continuing processing even when a centralized controller fails.

FIG. 1 is a block diagram illustrating a high level program flow of transforming a loosely coupled continuous query and rule set, and interweaving them into a tightly coupled system. The first step 101 includes receiving a streaming continuous query 107, CQ, and a decision tree 105 at central controller 103. Both the CQ 107 and the decision tree 105 access the edge agent 109. The CQ 107 pulls livestream data from the edge agent 109, and decision tree 105 has at least one end action that is enforced at the edge agent 109. At step 111, the central controller 103 breaks these two constructs 105, 107 apart. The continuous query 107 is broken apart into a sub-query 119 that accesses data available at the edge agent 109 and a super query 117 that accesses data from multiple edge agents (not shown). The rule set is broken into a rule subset 115 with decisions on attributes available at the edge agent 109 and a rule superset 113 with decisions on attributes not solely available at the edge agent 109. At step 121, the rule subset 115 and sub-query 119 are pushed to the edge agent 109. This distribution results in a tightly coupled system between queries and rules, where some edge actions are immediately performed at the edge agent 109 after being decided by the rule subset 115, and less data is transferred from the edge agent 109 to controller 103 because only attributes that meet the necessary decisions in the rule subset 115 are provided to the super-query 117.

A streaming continuous query applies traditional query operators, such as aggregates, predicates, and joins, to a live data stream to produce a result set of attributes. A continuous query may have some additional parameters to constrain how the query pulls data over time. For example, the continuous query may have a time interval parameter constraining the range of time for which a query will collect data. The continuous query may also have a frequency or period parameter defining how often the query pulls data. Continuous queries are typically executed on data streaming management systems (DSMS) that have a query based interface for pulling data from live data streams.

For example, a continuous query may include query statement such as:

```
SELECT T.symbol, sum(T.volume*T.price)
FROM Trades T [RANGE '5 minutes' SLIDE '30 seconds'], Information I
WHERE (T.symbol = I.symbol) and (T.Volume > 100) and (I.beta >1.05)
GROUP BY T.symbol;
``` where the aggregate operator "sum" calculates a total transaction value of transactions that meet the given decisions over a range of time of five minutes for a slide interval of every thirty seconds. Note that the stream of Trades T can be joined with the static table Information I, and predicates can be used regarding both tables. Here, the ticker symbol meeting the given predicates is a first attribute. As a second attribute, the total transaction value of trades are grouped by the attribute of ticker symbols.

In some embodiments, a continuous query may be executed by accepting data from multiple sources or a single source. A query execution engine may make this process transparent to the user or application executing the query. Upon execution, the query results may provide additional metadata regarding what agents provided data to satisfy the query.

In some embodiments, a central controller may leverage one or more application programming interfaces (APIs) to access multiple data streams. These APIs may provide associated documentation or metadata regarding the set of visible attributes, Se, available from a particular source, or in this case, the edge agent. These APIs may additionally provide a method for retrieving metadata regarding constraints, Ce, on the given attributes for a particular edge agent.

Decision Tree

A decision tree is a user interface for placing conditions on attributes to trigger an end action. A decision tree may be represented by a binary tree data structure where each internal node represents a Boolean expression on an attribute, the results of which determine whether the next branch is chosen. The leaves represent the actions to enforce. The same action can be on multiple leaf nodes, but the path to that action is different depending on the leaf. The paths to a leaf node represent a rule, which is all of the individual decisions combined with a Boolean "AND" operator.

Figure 2A:
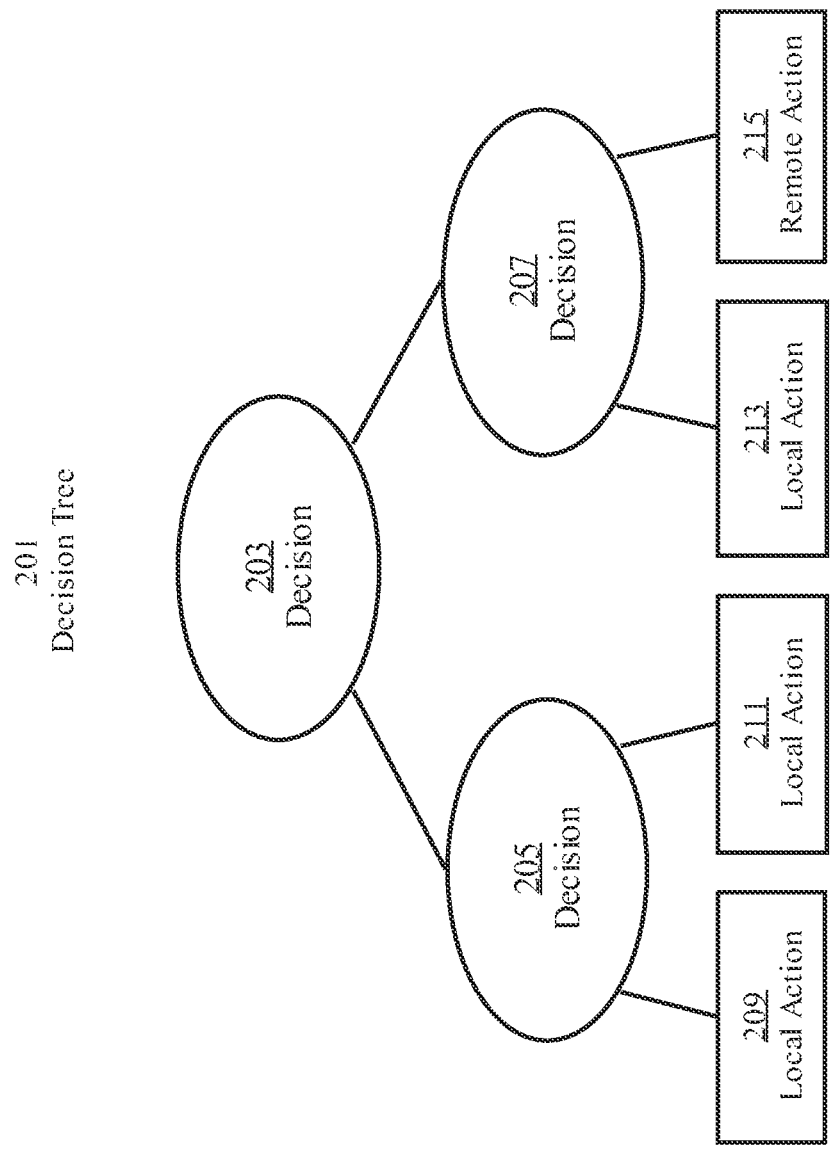
FIG. 2A is a block diagram of a decision tree used for examples.

FIG. 2A is a block diagram of a decision tree. Decision tree 201 has three decisions 203, 205, 207 and four actions. The actions are distributed across four leaf nodes 209, 211, 213, 215 showing that there are four separate paths to evaluate in this decision tree. End actions 209, 211, 213 execute locally at an edge agent output device, while the end action 215 executes through a remote output device.

End actions 209, 211, 213, 215 may be performed at the central controller, on an external device, or on a particular edge agent. In some embodiments, an end action may be executed or execution may be mimicked to determine if the action applies to a particular edge node. Upon execution, the feedback provided may provide additional metadata regarding what agents provided functionality to perform the requested action.

In some embodiments, a central controller may leverage one or more APIs to access functionality in a particular edge agent. These APIs may provide associated documentation or metadata regarding the set of edge actions Ae performable at a particular edge agent.

System Architecture

The system architecture of a control system comprises at least one computer defined as an edge agent and another computer defined as a central controller. A central controller is connected to all edge agents either directly or through one or more intermediary computers. Each computer may have live stream data sources coming from sensors or other computers. Each computer may also have one or more connected output devices.

Figure 3A:
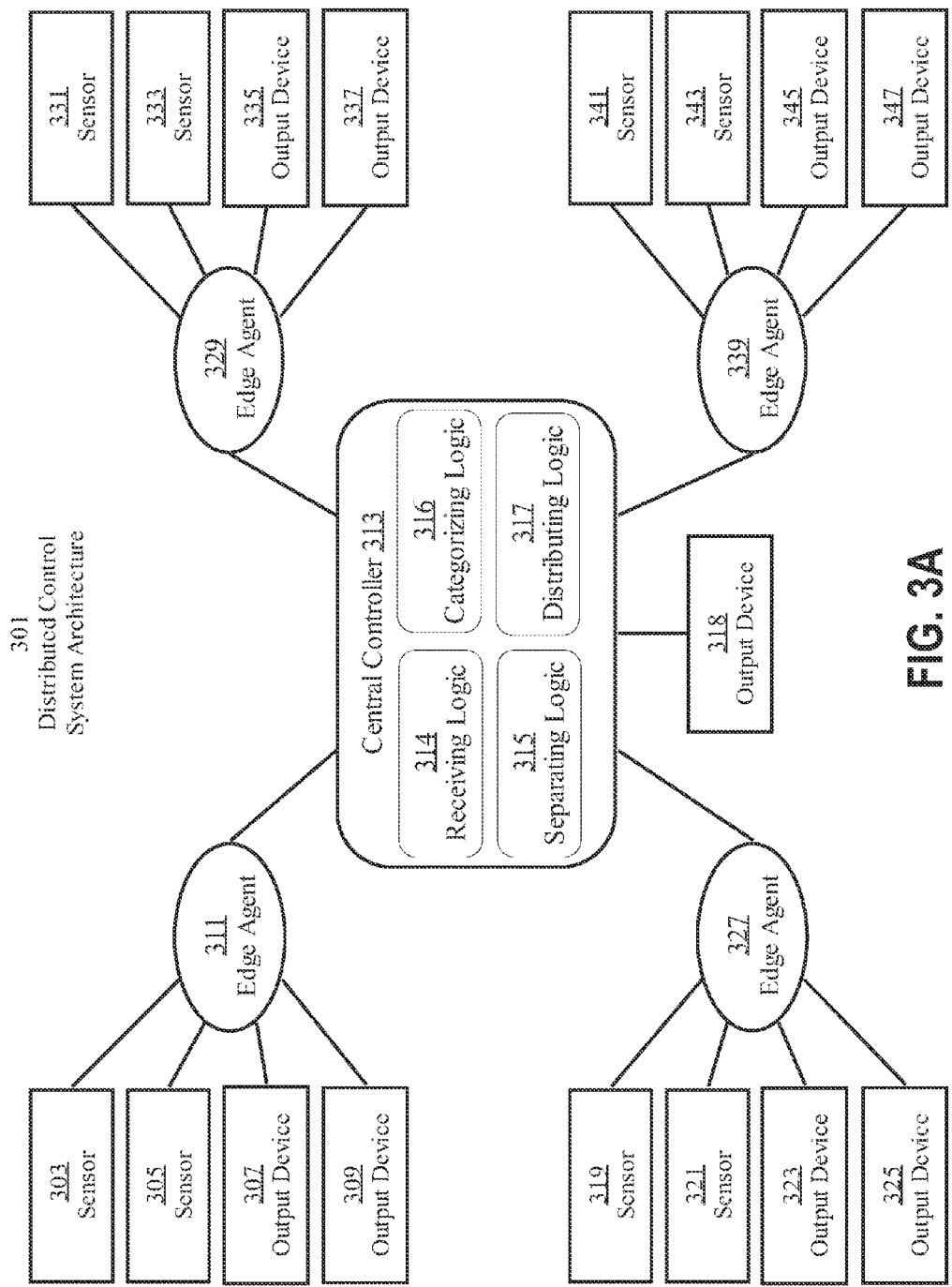
FIG. 3A is a block diagram illustrating an example system architecture of a sensor control system.

FIG. 3A is a block diagram illustrating a system architecture of a general control system. The central controller 313 has logic 314, 315, 316, 317 for operating on rule sets and queries. Receiving logic 314 receives rule sets and queries at an interface. The receiving logic 314 may transform a rule set expressed graphically on a graphic user interface into a computer readable format. Separating logic 315 separates a streaming continuous query into a super-query and a sub-query. Separating logic 315 may separate a streaming continuous query based on metadata regarding the attributes requested. Categorizing logic 316 splits and categorizes rules into a rule subset category and a rule superset category. Categorizing logic 316 may categorize a rule based on metadata regarding attributes and actions decided. Distribution logic 317 distributes the sub-query with the rule subset to the various edge agents 311, 327, 329, 339. Distribution logic 317 may leverage application programming interfaces available for the edge agents 311, 327, 329, 339. The central controller 313 connects to four edge agents 311, 327, 329, 339. Each edge agent 311, 327, 329, 339 has a first sensor 303, 319, 331, 341 and a second sensor 305, 321, 333, 343. Each edge agent 311, 327, 329, 339 also has additional outputs, such as a first output 307, 323, 335, 345 and a second output 309, 325, 337, 347. The central controller 313 also connects directly to additional output devices 318.

Central Controller

In some embodiments, the central controller is a computer for retrieving attributes from live data streams through a streaming continuous query. These attributes are used as parameters in decisional expressions to evaluate whether an action should be executed on an output device. The central controller also manages end actions on edge agents and other remote output devices. The central controller preferably provides a system design interface for controlling whether actions occur through a set of decisional expressions graphically depicted on a decision tree.

Edge Agent

In some embodiments, an edge agent is a specialized computer that provides attributes through data streams and provides access to output devices for performing actions. The edge agents may process raw data from a variety of sensors and provide the processed data as queriable attributes. Sensors include but are not limited to, accelerometers, gyroscopes, magnetometer, cameras such as infrared and visual light cameras, seismic detectors, temperature sensors such as thermistors and thermocouples, speedometers, pedometers, location sensors such as GPS, light detectors, weather detectors such as thermometers, weather vanes, anemometers, rain gauges, barometers, psychrometer, hygrometer, laser sensors, sonar sensors, and event emitters for computers that follow statistics such as CPU usage, bandwidth, Input/Output Operations Per Second (IOPS), and sensors for determining whether a system or process is running.

The edge agent may also receive commands regarding whether an action should be executed on an output device. Output devices include, but are not limited to, enabling or disabling sensors and other devices, powering on and off sensors and other devices, powering on and off automobile devices such as headlights, wipers, and cruise control, controlling traffic devices such as metering lights, stoplights, and other signals, controlling wearables and medical devices, turning on and off computer systems and processes, throttling data, controlling motors and other mechanical devices such as servomechanisms, and controlling computer events such as sending alerts.

In some embodiments, a computer may be an edge agent relative to the computer it is connected to. For example, in a cell phone network, a cell tower may be an edge agent with respect to a controller located at a central data center. However, with respect to cell phones, the cell tower is a central controller.

In these embodiments, the intermediate computer accepts attributes from other computers. These attributes are then pulled by the central controller through a streaming continuous query and used as parameters in decisional expressions to evaluate whether an action should be executed.

Implementation Example

Figure 4:
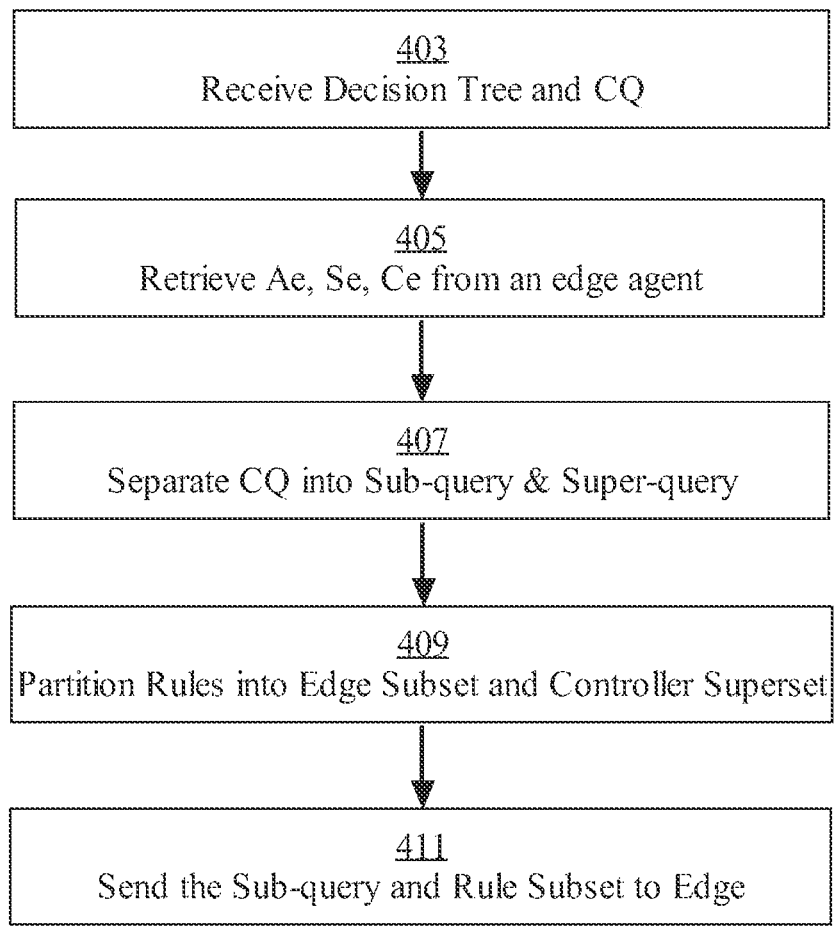
FIG. 4 is an example algorithm by which a centralized controller may take in a streaming continuous query and a rule set expressed as a decision tree, and automatically break these two constructs apart, and recouple them as tightly coupled subsystems.

FIG. 4 is an algorithm by which a centralized controller may take in a streaming continuous query, CQ, and a rule set expressed as a decision tree, and automatically break these two constructs apart, and recouple them as a super-query, a sub-query and subsets of rules with end actions associated with each query. The process starts at block 403 with a central controller receiving a decision tree and a streaming continuous query. At block 405, the central controller retrieves metadata about edge attributes, edge actions, and edge constraints, for a particular node. At block 407, the controller separates the streaming continuous query into a streaming continuous sub-query for a node and a super-query that pulls attributes from the sub-query. At block 409, the simplified expressions are partitioned into a subset of rules evaluable at the edge and a superset of rules evaluable at the central controller. At block 411, the central controller pushes the sub-query and edge agent decisions to the edge node. The process 409-411 may be repeated for all edge agents visible to the central controller.

Traffic Control System Example

As a representative example, many embodiments are described in the context of a traffic control system because car computers have sensors and output devices. However, the described example of a traffic control system is merely a specific type of control system with features representative of a control system that make describing a control system more understandable. The same principles apply to other types of control systems, including but not limited to, seismic sensor control systems, weather sensor systems, industrial manufacturing systems, cell phone networks, data centers distributed over wide area networks, air traffic control systems, and other control systems distributed over a network or wide area network.

Figure 3B:
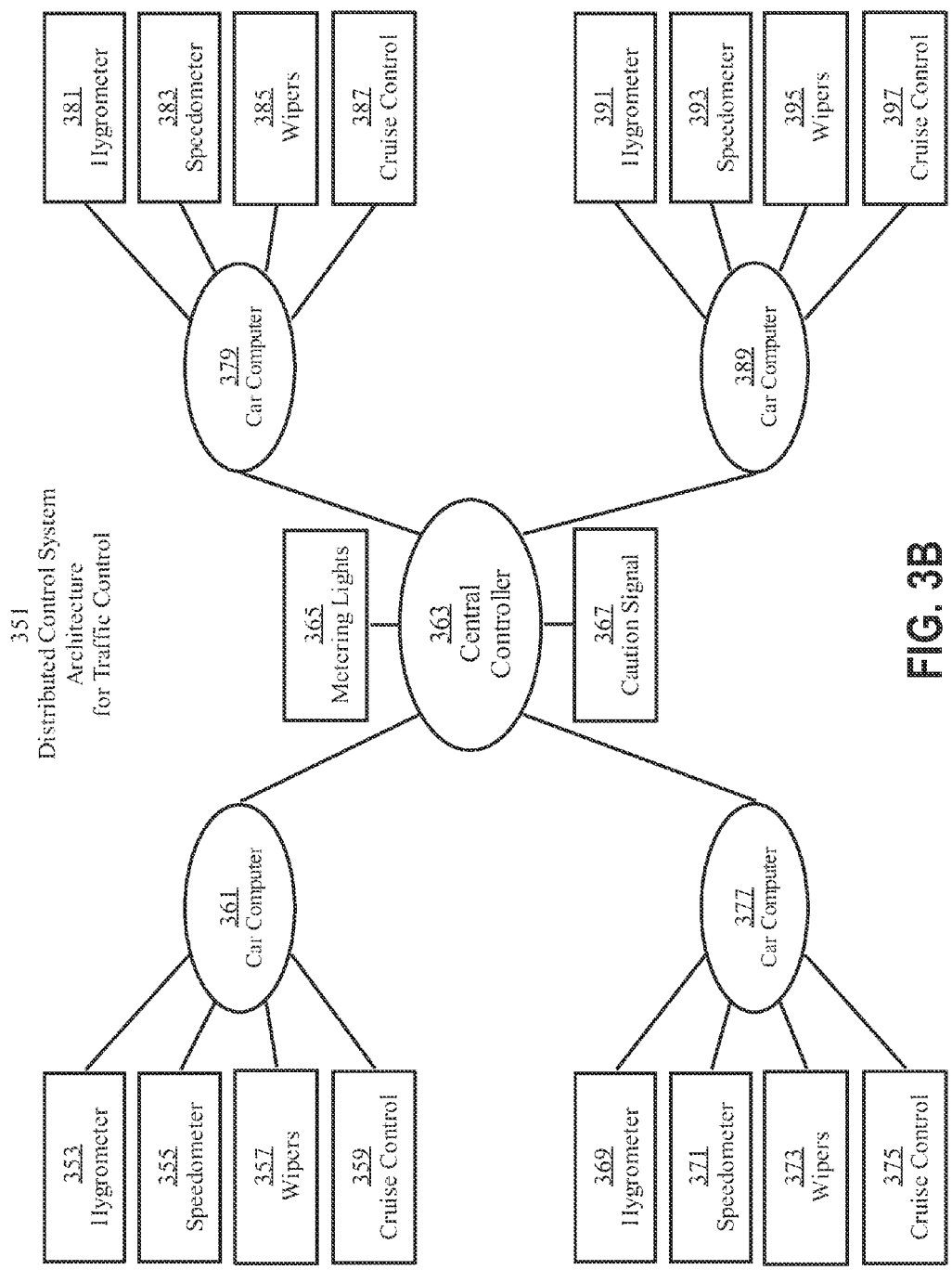
FIG. 3B is a block diagram illustrating a system architecture of a traffic control system example.

FIG. 3B is a block diagram illustrating a system architecture of a control system for traffic control. The central controller 363 connects to four car computers 361, 377, 379, 389. Each car computer 361, 377, 379, 389 has a hygrometer sensor 353, 369, 381, 391 and a speedometer 355, 371, 383, 393. Each car computer 361, 377, 379, 389 also has output devices such as wipers 357, 373, 385, 395 and cruise control 359, 375, 387, 397. The central controller 363 also connects to metering lights 365 for certain regions and caution signals 367 for certain regions.

Receiving a Decision Tree

Receiving logic is configured in the central controller to receive a rule set expressed as a decision tree. The receiving logic accepts user input directly and also accepts entire rule sets sent from other computers. A system designer creates a decision tree by creating a series of decisions on attributes available through a data stream to determine if an action should occur. Tools to create the decision tree may be available through a graphic user interface for generating a decision tree. A root node may signify a specific group in which the rule set applies. For example, for a live data stream of car data, some rules sets may apply for cars in a specific region, while another decision tree is created for cars in another specific region.

Figure 2B:
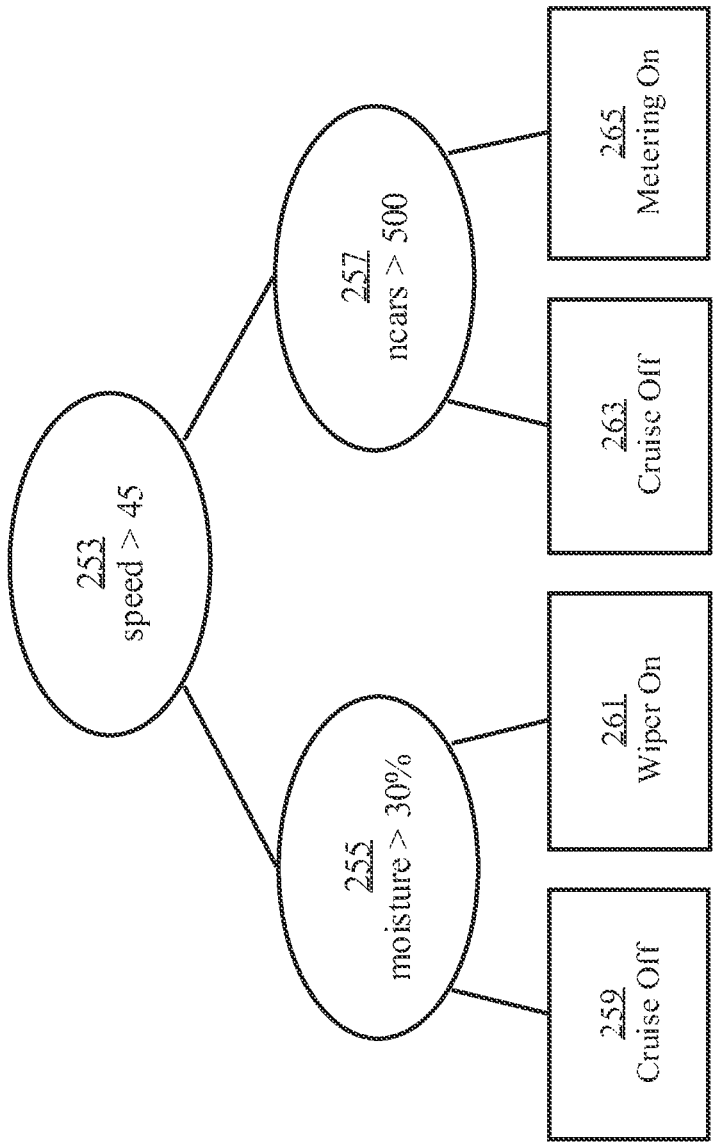
FIG. 2B is a block diagram of a decision tree for a traffic control system used for examples.

FIG. 2B is a block diagram of a decision tree for traffic control used for examples. Decision tree 251 has three decisions. Two decisions 253, 255 are determined based on attributes visible locally through sensors on a car, and one decision 257 is based on the aggregate number of cars in a certain region. The actions of the distributed decision system include changes to car controls (wipers 261, cruise control 259, 263) as well as to region-specific metering lights 265 which, when toggled on, control the intake of cars onto freeway on-ramps.

In some embodiments, adding an aggregate function to a decision tree changes the meaning of earlier nodes. In FIG. 2B, the meaning of decision 253 may have a different meaning in the context of decision 255 and decision 257. When a rule is created using decision 253 and decision 255, the rule results in two mutually independent values combined with an AND operator. However, when a rule is created by combining decision 253 and decision 257, the aggregate attribute ncars in 257 may actually reflect the number of cars with a speed greater than 45 mph.

Receiving a Streaming Continuous Query

Receiving logic is configured in the central controller to receive a streaming continuous query. The receiving logic accepts user input directly and also accepts entire streaming continuous queries sent from other computers. A streaming continuous query (CQ) is tailored to the attributes necessary to test every possible path within a decision tree. Thus, if some decisions require aggregate functions such as knowing the number of cars in a specific region, the continuous query is created to reflect an aggregate operator that counts the number of cars grouped by region.

In some embodiments, the CQ is created by a system designer, while in other embodiments the CQ is created automatically based on the decision tree. Decisions on single attributes may be reflected in predicates, and global decisions may be reflected using aggregate functions.

An example streaming continuous query for a traffic control system may include:

```
SELECT
    car_id, region, avg(moisture) as moisture,
    avg(speed) as speed, avg(ncars) as ncars, cq_close(*)
```

-continued

```
FROM cars as C <slices '1 minute'>
INNER JOIN
    (SELECT region, count(*) as ncars, cq_close(*)
    FROM cars <slices '1 minute'>
    WHERE speed > 45
    GROUP BY region) as R using (region);
GROUP BY car_id, region;
```

This streaming continuous query, CQ, pulls data from a live stream of car data.

Each car may provide a variety of car specific attributes, Se. These car specific attributes, Se, may include a 'car_id' (d1), a 'region' where the car is located (d2), the 'average moisture' over a minute (d3), the 'average light' over the minute (d4), the 'average speed' of the car over a minute (d5), whether the 'windows' are up or down (d6), and a timestamp 'cq_close' of the end of the last query execution (d7).

The CQ statement selects some of these attributes, D, so each car returns car specific attributes over intervals of 1 minute. The CQ also includes some aggregate attributes such as a count of the number of cars (d8) grouped by region, and in an inner join, the number of cars (d9) 'ncars' with a speed greater than 45 miles per hour grouped by region.

Retrieving Edge Agent Metadata

Separating logic is configured in the central controller to separate the streaming continuous query based on edge agent metadata. Each edge agent has metadata that defines three elements: a set of actions, Ae, that the edge agent may execute, a set of attributes, Se, visible at the edge agent, and a set of constraints, Ce, that are static or change so slowly in comparison with the other attributes, Se. In some embodiments, this metadata is defined by a user, so the data is available when the edge agent enters the network. In some embodiments, this metadata is provided by the central controller after an edge agent enters the network.

Each particular edge agent has an API to publish that particular edge agent's metadata to the central controller. Each particular edge agent also has an API for receiving commands from the central controller. This includes receiving a sub-query, Qe, that produces attributes and a set of rules to evaluate whether an action in Ae should be enforced.

In some embodiments, the edge agent may receive metadata from the central controller. For example, when an edge agent enters the network, a controller may run a series of commands to determine Ae, Se, and Ce.

For example, for a car computer, a central controller may receive the metadata Ae(a1, a2) which includes cruise off (a1) and wiper on(a2); Se(d1, d2, d3, d4, d5, d6, d7) described above; and Ce(d1=0001, d2=DISTRICT9).

Separating the Continuous Query into a Sub-Query

Once a controller receives a CQ that returns attributes, D, the controller retrieves the attributes in Se available at a particular edge agent. After a comparison of the attributes available in Se and the attributes requested in D, the attributes in the query CQ that are not available in Se are removed to create sub-query Qe. For example, the set of attributes received in D may include (d1, d2, d3, d4). A particular edge agent may have a subset of these attributes available at the local level Se=(d1, d2, d3). Thus, the CQ is restructured to request attributes, De, that meet the intersection of these tuples (d1, d2, d3).

In some embodiments, this process may include running CQ and Qe against each other to determine if they produce the same result records for the attributes requested. In some cases, after the query is restructured to return those attributes, the queries may be re-run to determine if Dg(d1, d2, d3)==Se(d1, d2, d3). In some cases, an attribute (for example d3) will not contain the same resulting values when evaluated by the CQ and evaluated by the sub-query Qe. This may be due to an aggregate operator running on both levels, or simply because more results are available through other edge agents. Thus, the sub-query may be restructure to return the resulting set of values that are equal. In this example, that would be Qe(d1, d2).

In the traffic example, the attributes requested by the CQ are Dg(d1, d2, d3, d4, d5, d8), and the edge specific attributes include Se(d1, d2, d3, d4, d5, d6, d7). To create a sub-query Qe, the CQ query is restructured to select the attributes selected in Dg but available in Se to provide De(d1, d2, d3, d4, d5).

When the system architecture includes a level of intermediate nodes that are geographically distributed, these intermediate nodes may be able to count the number of cars by region (d8) for the regions covered by each particular intermediate node. Thus, the intermediate node will have visible attributes Se(d1, d2, d3, d4, d5, d6, d7, d8). However, the d8 in Se at the intermediate node will not include all of the records that are included in the d8 in Dg, so the CQ will still be restructured to only provide De(d1, d2, d3, d4, d5) after comparing De(d1, d2, d3, d4, d5, d8) from the intermediate node with Dg(d1, d2, d3, d4, d5, d8) from the central controller.

Using these principles the CQ written above is separate into sub-query, Qe:

```
SELECT car_id, region, avg(moisture), avg(speed), cq_close(*)
FROM cars <slices '1 minute'>
```

RULE PARTITIONING

In some embodiments, the controller performs the steps of: (0) creating a set of rules R by mapping a decision tree to a set of rules. The central controller then loops over every edge agent and performs the following steps: (1) The controller applies constraint literals for a particular edge agent to the rules; (2) The controller loops through the rules left in R and splits them into expressions evaluable at the edge, and expressions evaluable at the controller: (Xe AND Xg); (3) The controller categorizes each rule as having decisions in Xe, Xg, or both (Xe AND Xg); (4) The controller splits rules that do not fall within a distinct category (Xe=>Ae) or (Xg=>Ag) by creating a propagation rule for the edge evaluable portions (Xe=>Ae'); (5) The controller creates a rule subset, Re, including rules that fall in (Xe=>Ae) and newly created rules (Xe=>Ae') for their respective edge agent, and a rule superset, Rg, including any remaining rules.

Mapping a Decision Tree to a Rule Set

In some embodiments, the central controller converts the decision tree into a rule-set-map with each action mapped to a Boolean expression in disjunctive normal form. This is done by mapping each path to an end action resulting in a defined set of conjuncts, and taking the union of all paths to the same action to make the rule for that specific action, $A_n$. For example, an action a1 may trigger if (x_1 AND x_2 AND . . . ) OR (x_1 AND x_5 AND . . . ) where x1 represents a decisional statement on a single attribute.

In some embodiments, the rule set R may be filtered at this stage by only pulling expressions from the rule set R having at least one decision with an attribute in the set De. For example, if a decision 203 did not include an attribute in De, and the other decision in the conjunct 207 did not include an attribute in De, then any remote actions 215 could be removed from the actions considered for pushing to the edge.

In some embodiments, a rule set R may be filtered at this stage by only pulling expressions from the rule set R having an end action enforceable at the edge agent, Ae. For example, paths to remote action 215 could be removed from the rules considered for pushing to the edge in this embodiment.

FIG. 5A is a block diagram illustrating the decision tree from FIG. 2A expressed in conjunctive and disjunctive normal form based on each path through the decision tree. There are four actions 209, 211, 213, 215, so the path to each action is defined by a set of AND statements. In rule 503, the path to local action 209 includes decision 203 AND decision 205. In rule 505, the path to local action 211 includes decision 203 AND decision 205. In rule 507, the path to local action 213 includes decision 203 AND decision 207. In rule 509, the path to remote action 215 includes decision 203 AND decision 207.

When multiple paths converge on the same action, a rule may be expressed in disjunctive normal form. For example, if local action 209 and local action 213 are the same action, then rule 503 and rule 507 may be combined in disjunctive normal form as shown in rule 513. As later described, if all of the attributes in rule 513 are local, then the entire expression may be pushed to an edge agent. Local action 211 and remote action 215 only have one path to them. Thus, rule 505 does not change when transformed into a disjunctive normal form rule 515, and rule 509 does not change when transformed into disjunctive normal form rule 517.

FIG. 5B is a block diagram illustrating the decision tree from FIG. 2B expressed in conjunctive and disjunctive normal form based on each path through the decision tree. There are three actions: cruise off 259 & 263, wiper on 261, metering on 265. After transforming the rules for each action into disjunctive normal form, rule 563 includes the conjuncts from rule 553 and rule 557; rule 565 includes the conjunct from rule 555; and rule 567 includes the conjunct from rule 559.

Applying Constraints

In some embodiments, the central controller applies constant literals from the constraints, Ce, pulled from a particular edge agent, to their corollary attributes or actions. This may simplify some expressions or result in a smaller rule subset provided to the edge agent. For example, as presented in FIG. 5A, decision 205 may always be false for a given edge agent after applying a constant Ce_1 to the underlying attribute. Because decision 205 always returns false, the entire rule 515 always returns false. For that particular edge agent, rule 515 may be removed from the set of rules that are evaluated to be pushed to an edge agent.

In some embodiments, some constants may provide contextual simplifications, Cg, for a particular edge agent with Ce. For example, in FIG. 5B a decision 257 from a rule 567 may be calculated based on the number of cars in a given region. The region attribute is set with a constant, Ce_2, because the region will remain relatively constant for a given car over a certain interval. Thus, aggregate attributes requiring 'region' need not be queried every time, but instead a constant literal for that attribute may be applied for each car. The contextual implications of this constant, can be applied to the decision 257 or the action 265.

For example, if a certain region does not have more than 500 cars located within the region, then decision 257 will always be false, and the rule 567 may be deleted from the set of rules that could be pushed to a particular edge agent. Similarly, if a particular region does not have an output device such as a metering on light, then the rule 567 may be removed from the set of rules that could be pushed to a particular edge agent.

Separating the Decision Tree into Edge Evaluable Rules

Categorizing logic is configured in the central controller to categorize each rule in the rule set as having decisions requiring attributes at the controller, the edge agent, or both. After applying the constraints, each rule in disjunctive normal form may be categorized into three different groups: a first group for pushing the edge, a second group for partially pushing to the edge, and a third group for not pushing to the edge. For each action the conjuncts are split into two parts Xe and Xg where Xe is the set of conjuncts on attributes in De of a specific edge agent, and Xg is the set of conjuncts on attributes that are in the global set Dg but not in De. This results in a DNF rule expressed as (Xe_1 AND Xg_1) OR (Xe_2 AND Xg_2) OR . . . OR (Xe_n AND Xg_n). For example, consider rule 513 from FIG. 5A as an example where the first conjunct, decision 203 AND decision 205, is X1 and the second conjunct, decision 203 and decision 207, is X2. If the attribute used in decision 203 is local and the attribute from decision 205 is local then Xe1 would have two expressions and Xg_1 would equal to zero reducing X_1 to (Xe_1). If the attribute used in decision 203 is local and the attribute from decision 205 is global then Xe1 would have one expression and Xg_1 would have one expression reducing X1 to (Xe_1 AND Xg_1). Finally, if the attribute used in decision 203 is global and the attribute from decision 205 is global then Xe_1, then X_1 reduces to (Xg_1).

Categorization is determined based on whether the reduced expression has terms in Xe, Xg or both Xe AND Xg.

In a first group of rules, every Xg_i is empty, and the action can be made at the edge agent level, so no involvement is required by the central controller to evaluate or enforce the action. This is true because each Xe_i only contains Boolean expressions on attributes that the edge agent has visibility over (i.e., attributes in De). This first group of actions are added to the rule subset Re.

In a second group of rules, the rule includes at least one attribute in De or one action in Ae, AND at least one attribute not in De or one action not in Ae. In this group of rules, some decision making may occur at the edge agent and some decision may occur at the central controller. The action is separated into two actions Ag_i and Ae_i'. The Ae_i' follows from expressions in Xe_i. This new rule is added to the rule subset Re.

The edge agent can evaluate Xe_i autonomously for each result tuple produced by Qe, and provide that result record to the controller only if Xe_i evaluated to be true and the overall sub-rule of (Xe_i AND Xg_i) needs to be evaluated. There is, therefore, no need to send an individual result tuple produced by Qe back to the central controller if Xe_i evaluated to be false for that record since that guarantees that the overall sub-rule of (Xe_i AND Xg_i) will also evaluate to false. This reduces the chattiness and communication overhead between edge agent and central controller. Thus, Ag_i still contains (Xe_i and Xg_i), but the entire rule is evaluated much less.

In a third group of rules, Xe_i is empty and the action is not in Ae. The decisions to trigger an action are made at the global controller level and effectively no sub-tree can be pushed down to the edge agent level.

FIG. 6 is a flowchart illustrating categorizing rules from FIG. 5B as edge expressions and partial edge expressions. Rule 565 is categorized first at flowchart 603. In box 605, the central controller compares the attributes in rule 565 against the attributes available at the edge, De, to place the conjunct in the expression (Xe AND Xg). The controller also compares the action in rule 565 against the actions available at the edge, Ae, to determine whether the rule is enforceable at the edge. The controller determines that rule 565 has decisions on attributes only in De and an action in Ae. At box 607, the rule 565 may be expressed as Xe_1=>Ae_1, so the rule 565 may be pushed directly to the edge.

Rule 567 is categorized second at flowchart 609. In box 611, the central controller compares the attributes in rule 567 against the attributes available at the edge, De, to place the conjunct in the expression (Xe AND Xg). The controller also compares the action in rule 567 against the actions available at the edge, Ae, to determine whether the rule is enforceable at the edge. The controller determines rule 567 has a decision with an attribute speed(d5) in De, an attribute ncars(d8) not in De, and an action metering-on(a3) not in Ae. At box 613, the rule may be expressed as (Xe_1 AND Xg_1)=>Ag_1, so the rule 567 must be partitioned into an Xe_1 action and an Xg_1 action before pushing the Xe_1 to the edge.

Figure 7:
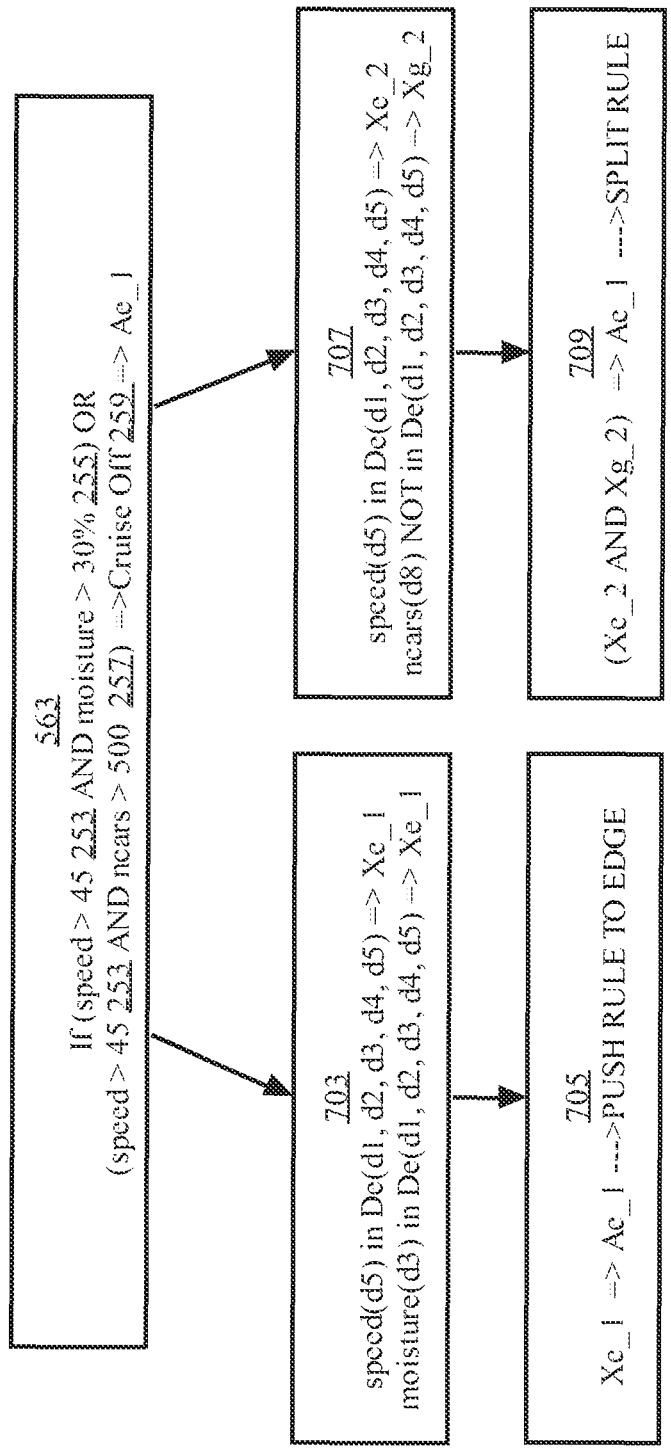
FIG. 7 is a flowchart illustrating categorizing a rule in disjunctive normal form from FIG. 5B as edge expressions and partial edge expressions.

FIG. 7 is a flowchart illustrating categorizing a rule in disjunctive normal form from FIG. 5B as edge expressions and partial edge expressions. The rule 563 has two conjuncts so each conjunct must be parsed and reviewed separately. In box 703, the central controller compares the attributes in the first conjunct of rule 563 against the attributes available at the edge, De, to place the conjunct in the expression (Xe AND Xg). The controller also compares the action in rule 563 against the actions available at the edge, Ae, to determine whether the rule is enforceable at the edge. The controller determines that the first conjunct of rule 563 has decisions on attributes only in De and an action in Ae. At box 705, the first conjunct of rule 563 may be expressed as Xe_1=>Ae_1, so that conjunct may be pushed directly to the edge.

In box 707, the central controller compares the attributes of the second conjunct in rule 563 against the attributes available at the edge, De, to place the conjunct in the expression (Xe AND Xg). The controller also compares the action in the second conjunct of rule 563 against the actions available at the edge, Ae, to determine whether the conjunct is enforceable at the edge. The controller determines the second conjunct of rule 563 has a decision with an attribute speed(d5) in De, an attribute ncars(d8) not in De, and an action cruise off(a1) in Ae. At box 709, the second conjunct of rule 563 may be expressed as (Xe_1 AND Xg_1)=>Ae_1, so the conjunct must be partitioned into an action triggered by Xe_1 and an action triggered by Xg_1 before pushing the Xe_1 to the edge.

Propagation Action

In some embodiments, the controller reviews all of the conjuncts expressed as (Xe_n AND Xg_n) for unique decisions in Xe. This second group of rules are rules for actions that are partially evaluable at the edge agent. The result of the parsing creates rules that trigger a propagation action, Ae_i', instead of the original action. Thus, even if the end action is different for a particular decision in Xe, the propagation action will be the same. In some embodiments, a propagation action may occur as a result of an expression being entirely evaluable at the edge, but the action must be enforced remotely.

Figure 8:
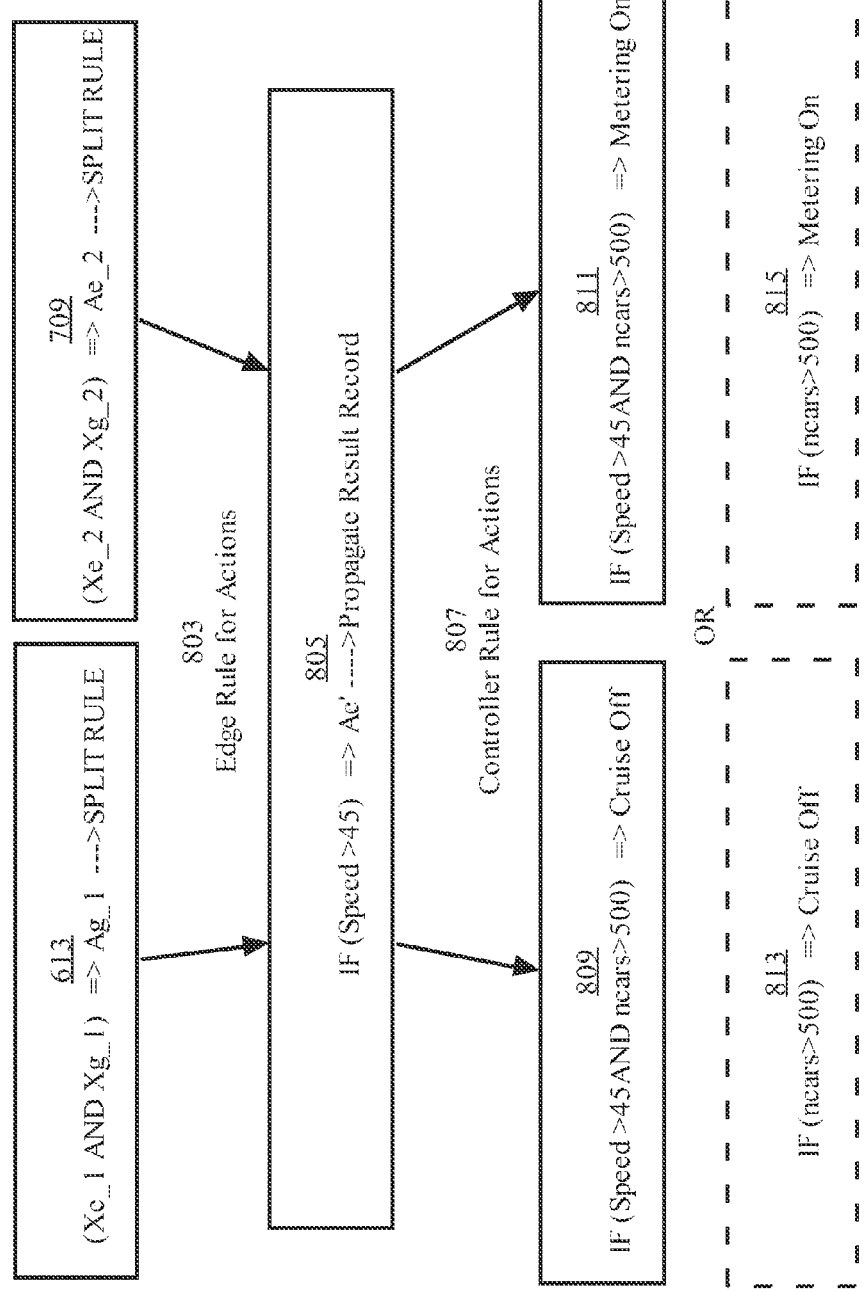
FIG. 8 is a flowchart illustrating splitting a rule into an edge expression and a global expression.

FIG. 8 is a flowchart illustrating splitting a rule into an edge expression and a global expression. For example, FIG. 8 presents two rules with two different end actions Ag_1 in rule 613 is for metering-on(a3), Ae_2 for rule 709 is for cruise-off(a1). However, in each heterogeneous expression there is one unique decision in Xe, speed>45. Thus, this decision is parse out of the rules and given its own propagation action Ae' at block 805.

In some embodiments, the propagation action, Ae_1', sends a result record back to the central controller in a push manner. In some embodiments, the propagation action makes attributes from the result record available to the central controller, only after determining Xe_i to be evaluated as true. In some embodiments, the result of Xe_i is reduced to a Boolean value that is provided to the central controller.

The rule at the controller is drafted based on the how the output of the rule at the edge is propagated. In some embodiments, the rule is left as is, so the rule can be evaluated at both the edge and then again at the controller once propagated. For example, rules 809, 811 are left as is for the rule set to be evaluated at the controller. Rules 813, 815 illustrate a way of drafting the rule at the controller using imperative logic. In still other embodiments, the rule is drafted using an additional Boolean attribute (d') in the place of the decision that was evaluated at the edge.

Separating the Decision Tree into a Rule Subset and Rule Superset

In some embodiments, the rule subset, Re, includes all rules evaluable at the edge plus the additional propagation rules created during rule partitioning. In some embodiments, the rule superset, Rg, comprises the original rule set R with the rule subset Re removed and the conjuncts partially evaluable at the edge replaced with the new controller rules.

As such, Re has rules that may be expressed as $Xe\_n \Rightarrow Ae\_n$. The rules in Rg comprise the rules that are left over. Without attempting to express every rule type, these rules may include rules expressed as $(Xe\_n$ AND $Xg\_n) \Rightarrow Ae$; $(Xe\_n$ AND $Xg\_n) \Rightarrow Ag$; $(Xg\_n) \Rightarrow Ae$; $(Xe\_n) \Rightarrow Ag$; $(Ae\_n'$ AND $Xg\_n) \Rightarrow Ae$; $(Ae\_n'$ AND $Xg\_n) \Rightarrow Ag$; $(d'\_boolean$ AND $Xg\_n) \Rightarrow Ae$; $(d'\_boolean$ AND $Xg\_n) \Rightarrow Ag$. Actions with only decisions evaluable at the edge $Xe\_i \Rightarrow Ae\_i$ were removed from the rule set and placed into a rule subset Re leaving a rule set for actions Ag and Ae. These actions may have only decisions evaluable at the controller Xg_i or they have decisions evaluable at both the controller and the edge agent (Xg_i AND Xe_i). These actions may be evaluated normally by calling attributes from a streaming continuous query. These actions may be evaluated based on a triggering action Ae_n' being received at the controller.

Optionally, the rule superset Rg has the decisions Xe_i replaced with a Boolean value, d'_boolean. In some embodiments, the edge agent propagates result records to the central controller after a TRUE evaluation of a partial set of decisions. For example, the propagation action Ae_i' occurs if Xe_i==True. This propagation action may result in evaluation of the entire expression for Ag_i as Xg_i AND Xe_i at the central controller. The central controller could re-evaluate Xe_i to get the true result. However, in a simplified manner, the central controller may simply evaluate the expression as d'_boolean AND Xg_i. In an even more simplified manner, the central controller may evaluate Xg_i alone, after receiving the propagation. The actual manner in which the central controller evaluates an expression partially evaluable at the edge agent depends on whether the attribute is required by other rules in the superset. For example, if another decision requires an average of the same attribute, then the attribute is propagated rather than a Boolean value. The system provides an optimal chattiness across the network by simplifying decision to Booleans where possible, but not allowing the same attribute to be queried more than once. The central controller may be communicating with the edge agent through a triggered push of a result record from the edge agent. Alternatively, the central controller may also communicate with the edge agent by continuously pulling attributes from the edge agent. In this method, the edge agent only provides the requested records upon successful evaluation of Xe_i.

Separating the Continuous Query into a Super-Query

While the original streaming continuous query continually received all requested data, the super-query only receives requested data that meets the predicates defined by the sub-rule set. In this manner less data is transferred over the network.

In some embodiments, the super-query, Qg, is a copy of the original streaming continuous query CQ. Under this method, the central controller ensures that no data is lost that may be necessary to evaluate the rule superset, Rg. The requested attributes are only provided by the edge agent to the central controller if the decisions and predicates are met at the edge agent first. The super-query may continuously stream, but only records meeting the required predicates evaluated at the edge are ever returned. Alternatively, the super-query may only receive data after an action from an edge agent.

The central controller separates the CQ, written above, into super-query, Qg:

```
SELECT
    car_id, region, avg(moisture) as moisture,
    avg(speed) as speed), avg(ncars) as ncars, cq_close(*)
FROM cars as C <slices '1 minute'>
INNER JOIN
    (SELECT region, count(*) as ncars, cq_close(*)
    FROM cars <slices '1 minute'>
    WHERE speed > 45
    GROUP BY region) as R using (region);
GROUP BY car_id, region;
```

In some embodiments, the super-query may be automatically rewritten based on the attributes required in the rule superset, Rg. For example, some attributes originally queried by CQ may no longer be necessary because the edge actions with decisions containing those attributes are being pushed to the edge. In another example, some decisions Xe_i in the rule superset Rg may have been replaced by a Boolean value. The super-query may be redrafted to request records with a predicate requiring the Boolean value to be true. The super-query may also be rewritten to request the Boolean value as an attribute.

In some embodiments, the controller separates the CQ, written above, into super-query, Qg:

```
SELECT
    region, avg(speed) as speed, cq_close(*)
FROM cars as C <slices '1 minute'>
INNER JOIN
    (SELECT region, count(*) as ncars, cq_close(*)
    FROM cars <slices '1 minute'>
    WHERE speed > 45
    GROUP BY region) as R using (region);
GROUP BY car_id, region;
```

Wherein this super-query only contains attributes necessary to evaluate rules in Rg.

Transferring a Rule Subset with a Subquery

Distributing logic in the central controller is configured to provide the sub-query and the set edge expressions from the edge-specific rule subset Re to one or more edge computers. In some embodiments, once the rule subset Re, the rule superset Rg, the sub-query Qe, and the super-query Qg have been separated, the controller may push the rule subset Re and the sub-query Qe to the edge agent using an edge agent API.

Therefore, the central controller pushes the sub-query, Qe, to the edge:

```
SELECT car_id, region, avg(moisture), avg(speed), cq_close(*)
FROM cars <slices '1 minute'>
```

The central controller also pushes the edge-specific rule subset, Re, to the edge:
Re_1: (speed>45) AND (moisture<30%)=>cruise-off
Re_2: (speed>45) AND (moisture<30%)=>wiper-off
Re_3: (speed>45)=>propagate The resulting super-query, Qg, remaining at the central controller includes:

```
SELECT
    car_id, region, avg(moisture) as moisture,
    avg(speed) as speed, avg(ncars) as ncars, cq_close(*)
FROM cars as C <slices '1 minute'>
INNER JOIN
    (SELECT region, count(*) as ncars, cq_close(*)
    FROM cars <slices '1 minute'>
    WHERE speed > 45
    GROUP BY region) as R using (region);
GROUP BY car_id, region;
```

The resulting rule superset, Rg, remaining at the controller includes:
Rg_1: (speed>45) AND (ncars<500)=>cruise-off
Rg_2: (speed>45) AND (ncars<500)=>metering-on Optionally, in some embodiments, a reduction algorithm may be used to simplify the Boolean logic further before finalizing a rule set or sending it to an edge. For example, in the expression (x_1 AND x_2 AND . . . ) OR (x_1 AND x_5 AND . . . ), both conjuncts have x_1 as a term. Thus, x_1 could be factored out such that x_1 AND ((x_2 AND . . . ) OR (x_5 AND . . . )). Using FIG. 5A, such an optimization may be applied to rule 513 in some situations. For example, if decisions 203, 205, and 207 are all on edge attributes, the IF statement may be simplified to (decision 203 AND (decision 205 OR decision 207)).

Tightly Coupled Distributed Rule Set Evaluation

This process repeats for every node on the edge with a connection to the central controller. Once each edge agent has been modified to determine actions on its own, the node is independent and many actions will continue to run even if the edge agent loses connection with the central controller or the central controller fails.

Figure 9:
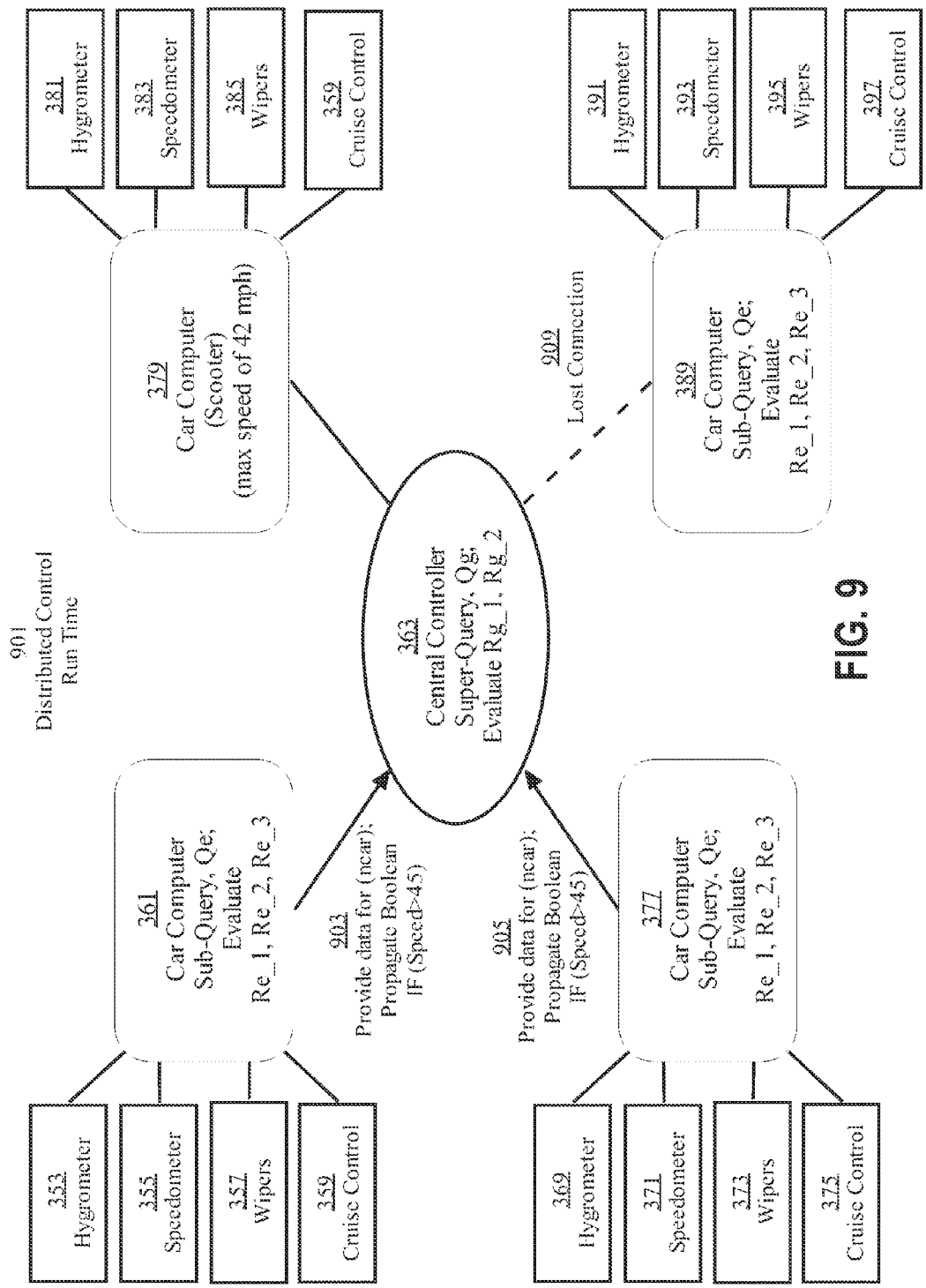
FIG. 9 is a block diagram illustrating an example system architecture of a distributed sensor control system running with a tightly coupled continuous queries and rule sets.

FIG. 9 is a block diagram illustrating a system architecture of a distributed sensor control system running with a tightly coupled continuous queries and rule sets. Car computers 361, 377 are running sub-query, Qe and evaluating the edge rules, Re_1, Re_2, and Re_3. Rule Re_3 results in a propagation action IF (speed>45) at 903. Following the entire data path. Raw data is computed by speedometer 355. The raw data is aggregated as an attribute of avg(speed) over a minute by Qe in car computer 361. Re_3 reads this data and determines that speed>45. As a result connection 903 is activated. The central controller 363 then aggregates this data along with data provided by 377 and others (not shown) to determine if rules Rg_1, and Rg_2 have been met.

Car computer 379 is controlling a scooter with a max speed of 42 mph. This value may be stored as a constraint Ce for that particular edge agent 379. After determining that all rules is Re and Rg will always results in a FALSE evaluation, the central controller 363 determines that no rules may be pushed to car computer 379.

Car computer 389 has currently lost connection 909 with the central controller 363. This may be because of bad weather, geographic features that limit signal, or being located in a place with poor coverage. In any event, car computer continues to evaluate Re_1 and Re_2. If the given conditions are met, then car computer 389 will activate wipers 395 or cruise control 397 without requiring contact from central controller 363 because all necessary rules have been pushed to car computer 389 previously.

Recursion on Multi-Tier Systems

In some embodiments, the program flow described above can be applied recursively. For example, in a multi-tiered system architecture the central controller first applies the process to push a rule subset and sub-query to each node on the intermediate level. Then each intermediate node acts as a central controller, and re-applies the above program flow to the edge nodes directly connected to it. The process repeats recursively until a lower tier does not exist.

Figure 10:
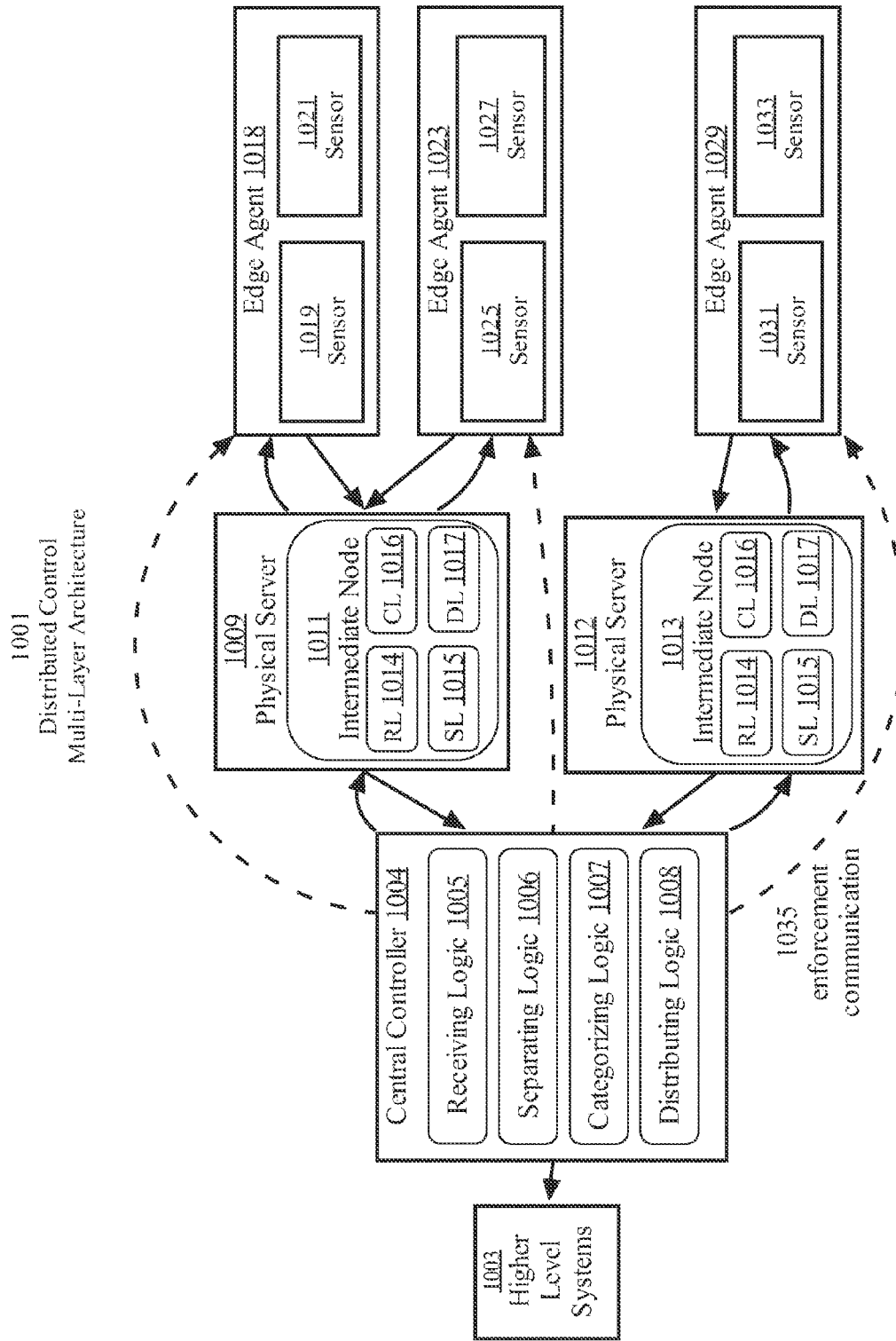
FIG. 10 is a block diagram illustrating an example multi-tier system architecture of a distributed sensor control system running with a tightly coupled continuous queries and rule sets.

FIG. 10 is a block diagram illustrating a multi-tier system architecture of a distributed sensor control system running with a tightly coupled continuous queries and rule sets. The central controller 1004 has logic 1005, 1006, 1007, 1008 for operating on rule sets and queries. The intermediate nodes 1013, 1011 may also have similar logic 1014, 1015, 1016, 1017. Receiving logic 1005, 1014 receives rule sets and queries at an interface. The receiving logic 1005 may transform a rule set expressed graphically on a graphic user interface into a computer readable format. The receiving logic 1014 may also comprise an API for receiving rules from a higher level computer 1004. Separating logic 1006, 1015 separates a streaming continuous query into a super-query and a sub-query. Separating logic 1006, 1015 may separate a streaming continuous query based on metadata regarding the attributes requested. Categorizing logic 1007, 1016 splits and categorizes rules into a rule subset category and a rule superset category. Categorizing logic 1007, 1016 may categorize a rule based on metadata regarding attributes and actions decided. Distributing logic 1008, 1017 distributes the sub-query with the rule subset to the various edge agents 1018, 1023, 1029. Distributing logic 1008, 1017 may leverage application programming interfaces available for the edge agents 1018, 1023, 1029.

With respect to the central controller 1004, the intermediate nodes 1011, 1013 act as edge agents, receiving rules and sub-queries from a central controller 1004. With respect to the edge agents 1018, 1023 intermediate node 1011 acts as a controller sending rules down to the edge agents 1018, 1023, and receiving attributes back from the edge agents 1018, 1023 after the data has been process. Similarly, with respect to the edge agent 1029, the intermediate node 1013 acts as a controller sending rules down to the edge agent 1029, and receiving attributes back from the edge agent 1029 after the data has been process. The hierarchy structure could continue with higher level systems 1003.

The constraints at the intermediate layer may be different than the constraints for the edge layer. For example, if the physical servers 1009, 1012 are stationary towers, then they may only receive a region attribute from a single region. After applying this constraint, central controller 1004 may be able to push aggregate rules that aggregate information on a regional basis to the intermediate nodes 1011, 1013.

The same constraint would not be available at the edge agents 1018, 1023, 1029. The location of a particular edge agent may change significantly. For example, the edge agent 1023 may lose connection with the server 1009, and reconnect with server 1012. In this case, the region data for edge agent 1023 would change. Aggregate attributes grouped by region are not pushed to edge agents 1018, 1023, and 1029 in this scenario.

In some embodiments, enforcement points may be sent back to the central controller 1004 that decide edge actions based on some global attributes, so the intermediate nodes 1011, 1013 need not be involved in enforcement communications. For example, as presented in FIG. 10, an edge agent 1029 with an action enforceable at the edge, but a decision requiring a global attributed from central controller 1004 may send a return communication through intermediate node 1013, that enforcement of that particular action is occurring at the edge agent 1029, instead of the intermediate node 1013. The central controller 1004 may then send enforcement decisions based on global attributes directly back to the edge agent 1029 through enforcement communication 1035. This communication 1035 may be relayed through physical server 1012 or through any other connection (not shown), but the intermediate node 1013 does not need to be involved in the enforcement process.

New Constraints

When a new constraint is applied to a node, the constraints, Ce, for that particular node change. The constant literals used to simplify the rules running on that node may no longer apply. Thus, the node must notify the central controller 1004 to re-run at least the rule partitioning process described above.

For example, as presented in FIG. 10 the location data of the edge agents 1018, 1023, 1029, may change slowly over time, such that region information need not be pulled on a regular basis. Instead, constraints regarding region are applied to the rules pushed to the individual edge nodes. After the edge agent 1023 leaves a region defined by being connected to intermediate node 1011, the edge agent 1023 may continue to run local rules for a period of time as if the region has not changed. Upon entering a new region defined by being connected to the intermediate node 1013, the edge agent 1023 may update its constraints and request new rules.

More or Fewer Nodes

In some embodiments, adding or removing a node from the system causes a rule partitioning algorithm to re-run for that particular node, but not repeat for all nodes. Adding a node to the system may involve a controller sending or receiving new metadata Ae, Se, Ce, for that particular node. Removing a node from the system may involve a central controller removing edge rules Re and edge queries Qe from the edge agent or intermediate node, and removing metadata. When removing an intermediate node from the system, new connections may need to be instantiated, so rules, attributes, and enforcement communications may be properly facilitated between edge agents and the central controller.

In some embodiments, adding or removing nodes from the system requires a special constraint or command to reflect the system change at the central controller. For adding a node to the system, the node must notify the central controller to run the process described above. For removing a node from the system, the node must notify the central controller, so the central controller can update any global constraints Cg applied to the system.

In some embodiments, Cg may be applied decisions in the decision tree map to simplify a decision tree before running the partitioning algorithm on all available edge agents.

For example, in the previous described example 'ncars' is a significant attribute in decision 257. If the volatility of this attribute changes because the number of cars available for a specific region is less than 500, then the central controller may delete any rules including conjuncts from a rule 557, 559 including that decision. Certain rules 805 that before resulted in a propagation action may be restructured such that the edge action may be computed entirely at the controller.

Changing Rules

In some embodiments, changing at least one decision in a decision tree causes the central controller to re-calculate how the rule set and continuous query should be partitioned and sent out to the edge. For example, if a system designer creates a distributed control system for managing the CPU of three computers, the decision tree may include an attribute (d1) of CPU consumption. In a first attempt to monitor the data center, a system designer may draft a rule to count the number of times consumption is greater than 80% at a single computer: IF any of the three devices has a CPU consumption greater than 80%=>increment a counter (Ag_1). The central controller accepts this rule with a CPU consumption attribute continuous query, and breaks the rule into Xe(CPU>80%)=>Ae'-propagate Boolean(d2), and Xg(COUNT d2)=>increment a counter (Ag_1). The Xe rule is automatically pushed out to the edge as previously described. After a week, the system designer realizes that a single computer may experience peak loads sporadically, but this does not change the overall effect on the three computer system. So, the system designer redrafts the rule in the decision tree to: IF the average of the three CPU consumptions is greater than 80%=>increment a counter (Ag_1). This new rule is partitioned according to the partition algorithm, showing that the new rule is a global rule with no edge components Xg(average(d1))=>increment counter, Ag_1. The global rule may not be pushed to the edge nodes.

Rather than having to delete the old rules manually, the system controller compares the old rule subset for Ag_1, Re_old, and superset, Rg_old, with the new rule subset for Ag_1, Re_new, and superset Rg_new. The comparison indicates the re-partitioning resulted in different rule sets, so the old rule sets are automatically deleted, and replaced by the new rule set.

In some embodiments, the new rule set may result in receiving a new continuous query. In some embodiments, a comparison of attributes may be used to show that a new continuous query is not required.

Internet of Everything

Internet of Everything (IoE) or Internet of Things (IoT) networks leverage a variety of sensors and computers loosely connected by a wide area network to gather data from sensors, analyze the data, and then, based on the analytics, take actions on those things. These actions often include controlling the sensors themselves. This control loop offers unique obstacles when compared to the traditional sensor control system because of unreliable network connectivity, variable latency across the network, dynamic changes to the number of sensors, geographic distribution of sensors, changes to rule sets, and availability of nodes on the network. The interweaving of a data analytics with decisions and enforcement into a distributed system of tightly coupled analytics and decisions minimizes the system down time associated with these obstacles.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
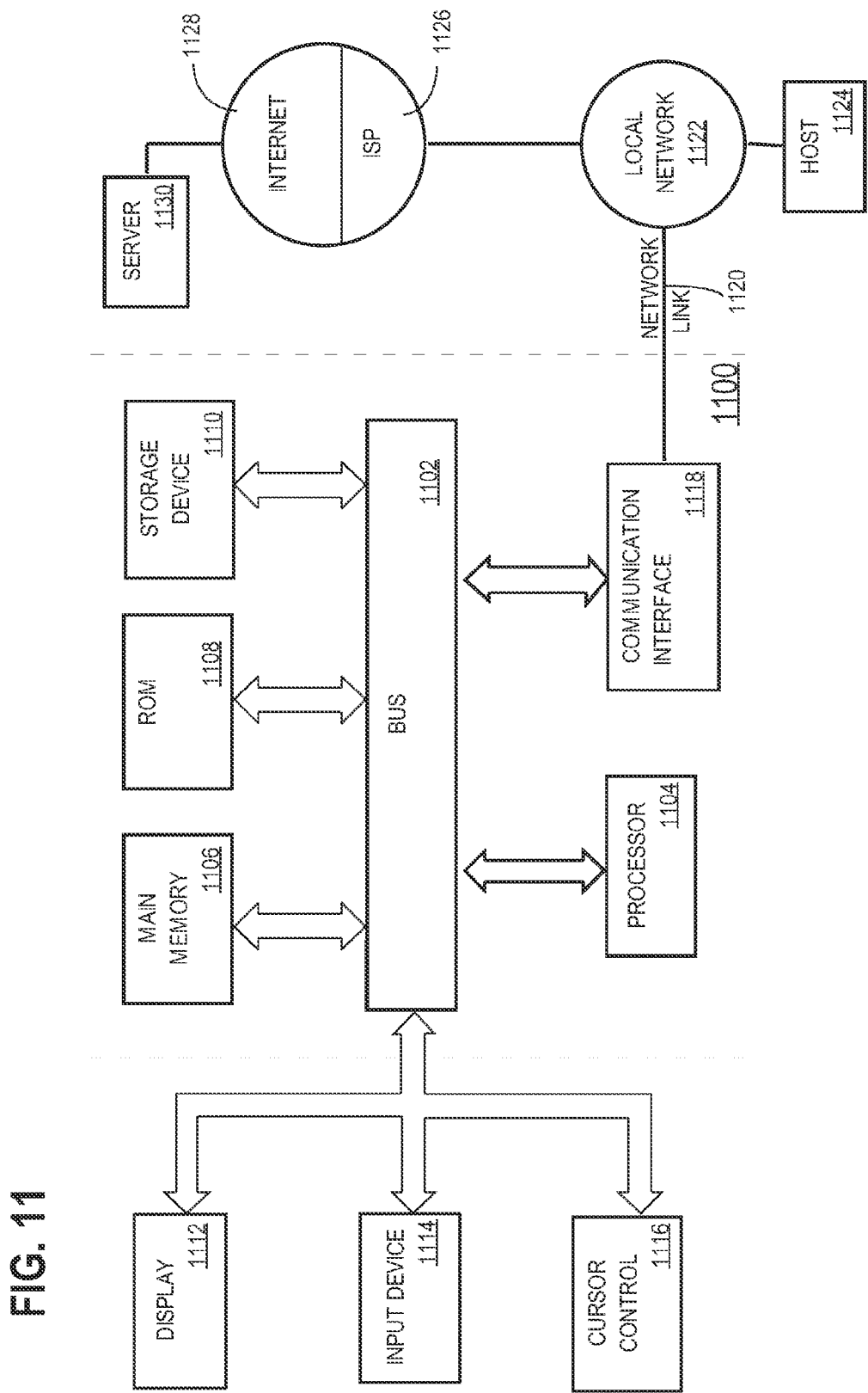
FIG. 11 is block diagram illustrating a computer system that may be used to implement the techniques described herein.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk, optical disk, or solid-state drive is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1110. Volatile media includes dynamic memory, such as main memory 1106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid-state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. An improved computer-implemented method of efficiently determining actions to perform based on data from streaming continuous queries in a distributed computer system, the method comprising:
    at a central control computer:
        receiving a streaming continuous query and a rule-set; wherein the rule-set comprises decision data representing a plurality of decisions based on a plurality of attributes produced by the streaming continuous query, and action data representing end actions based on the plurality of decisions, wherein the plurality of attributes comprise data processed by one or more networked computers;
        separating the streaming continuous query into a sub-query executable at one or more edge computers;
        categorizing each rule from the rule-set into a set of one or more edge expressions that are configured to be evaluated at an edge computer to cause an action;
        providing the set of one or more edge expressions and the sub-query to at least one edge computer with instructions to process visible attributes on the edge computer and to evaluate the set of one or more edge expressions independently from the central control computer;
    wherein the method is performed by one or more computing devices.

2. The method of claim 1, wherein separating the streaming continuous query further comprises:
    retrieving a first set of attributes available at a particular edge computer of the one or more edge computers;
    comparing the first set of attributes available at the particular edge computer with a second set of attributes requested in the streaming continuous query;
    creating, from the streaming continuous query, the sub-query to request a third set of attributes, wherein the third set of attributes comprises an intersection of attributes from the first set of attributes available at the particular edge computer and the second set of attributes requested in the streaming continuous query.

3. The method of claim 2, wherein retrieving the first set of attributes available at the particular edge computer includes scanning the particular edge computer for metadata of visible attributes at the particular edge computer.

4. The method of claim 1, wherein separating the streaming continuous query comprises separating the streaming continuous query into the sub-query executable at the one or more edge computers, and a super-query comprising at least some attributes and syntax from the streaming continuous query and not in the sub-query; wherein the super-query aggregates attributes provided by a propagation action performed at a plurality of edge computers including the one or more edge computers.

5. The method of claim 1, wherein the rule-set is expressed as a decision tree, wherein each branch in the tree represents a true outcome of a decision applied to a set of one or more attributes and each leaf in the tree represents an end action taken on a networked computer, wherein each rule in the rule-set is derived by combining each branch in a path to an end action with an AND operator, and combining multiple paths to a single end action with an OR operator.

6. The method of claim 1, wherein the categorizing step includes applying a set of one or more computer specific constraints to the plurality of attributes within each expression to determine whether evaluation of any expression results permanently in a false decision such that the central control computer determines not to provide that particular expression to the edge computer.

7. The method of claim 1, wherein categorizing each rule from the rule-set includes parsing each rule into a first set of expressions based on decisions requiring attributes available at the edge computer and a second set of expressions based on decisions requiring attributes from a plurality of edge computers; wherein the first set of expressions are categorized into the set of one or more edge expressions that are configured to be evaluated at the edge computer to cause the action.

8. The method of claim 7, further comprising creating a separate rule for a propagation action when parsing a given rule from the rule-set results in a first decision from the given rule in the first set of expressions and a second decision from the given rule in the second set of expressions.

9. The method of claim 8, further comprising combining the separate rule for the propagation action with another rule for the propagation action when both rules result in the propagation action of a same attribute.

10. The method of claim 1, wherein the networked computers comprise a multi-tiered hierarchy, wherein edge specific attributes with respect to an intermediate computer represent attributes from more than one computer with respect to a lower tiered computer, and the intermediate computer represents the central control computer with respect to the lower tiered computer; wherein the intermediate computer represents the edge computer to a higher tiered computer; wherein the steps are applied recursively to available networked computers except for any computer on a lowest tier.

11. A system comprising:
    a controller computer, coupled to one or more edge computers;
    receiving logic, in the controller computer, that is configured to receive a streaming continuous query and a rule-set;

wherein the rule-set comprises decisions based on attributes produced by the query, and end actions based on the decisions, wherein the attributes comprise data processed by one or more computers on a network;

separating logic, in the controller computer, that is configured to separate the streaming continuous query into a sub-query executable at one or more edge computers;

categorizing logic, in the controller computer, that is configured to categorize each rule from the rule-set based on decisions requiring attributes available from the sub-query into a set of one or more edge expressions evaluable at an edge computer to cause an action;

distributing logic, in the controller computer, that is configured to provide the set of one or more edge expressions and the sub-query to at least one edge computer to enable processing of visible attributes on the edge computer and evaluation of an action independently from the controller computer.

12. The system of claim 11, wherein the receiving logic is configured to receive the rule-set expressed as a decision tree, wherein each branch in the tree represents a true outcome of a decision applied to a set of one or more attributes and each leaf in the tree represents an end action taken on the network, wherein the rule-set is derived by combining each branch in a path to an end action with an AND operator, and combining multiple paths to a single end action with an OR operator.

13. The system of claim 11, wherein the separating logic, in the controller computer, is configured to separate the streaming continuous query by looping through each edge computer from the one or more edge computers on the network to determine attributes that are visible at a particular edge computer, and creating the sub-query for the particular edge computer by removing, from the streaming continuous query, a statement requiring an attribute unavailable at the particular edge computer.

14. The system of claim 13, wherein the separating logic, in the controller computer, is configured to separate the streaming continuous query by separating the streaming continuous query into the sub-query executable at one or more edge computers, and a super-query comprising at least some attributes and syntax from the streaming continuous query but not in the sub-query.

15. The system of claim 11, wherein the categorizing logic, in the controller computer, is configure to review metadata on each computer to determine actions requiring expressions based on edge specific attributes and expressions based on attributes from more than one computer, wherein an action requiring both expressions is separated into two actions, wherein a propagation action is created for expressions based on edge specific attributes.

16. A system comprising:

a controller computer, coupled to one or more intermediate computers each of which is coupled to one or more lower tiered computers;

receiving logic, in the controller computer, that is configured to receive a streaming continuous query and a rule-set; wherein the rule-set comprises decisions based on attributes produced by the query, and end actions based on the decisions, wherein the attributes comprise data processed by one or more computers on a network;

separating logic, in the controller computer, that is configured to separate the streaming continuous query into a sub-query executable at the intermediate computer;

categorizing logic, in the controller computer, that is configured to categorize each rule from the rule-set based on decisions requiring attributes available from the sub-query into a set of one or more edge expressions evaluable at the intermediate computer to cause an action;

distributing logic, in the controller computer, that is configured to provide the set of one or more edge expressions and the sub-query to at least one intermediate computer to enable processing of visible attributes on the intermediate computer and evaluation of an action independently from the controller computer.

17. The system of claim 16, wherein the receiving logic is configured to receive the rule-set expressed as a decision tree, wherein each branch in the tree represents a true outcome of a decision applied to a set of one or more attributes and each leaf in the tree represents an end action taken on the network, wherein the rule-set is derived by combining each branch in a path to an end action with an AND operator, and combining multiple paths to a single end action with an OR operator.

18. The system of claim 16, wherein the separating logic, in the controller computer, is configured to separate the streaming continuous query by looping through each edge computer from the one or more edge computers on the network to determine attributes that are visible at a particular edge computer, and creating the sub-query for the particular edge computer by removing, from the streaming continuous query, a statement requiring an attribute unavailable at the particular edge computer.

19. The system of claim 18, wherein the separating logic, in the controller computer, is configured to separate the streaming continuous query by separating the streaming continuous query into the sub-query executable at one or more edge computers, and a super-query comprising at least some attributes and syntax from the streaming continuous query but not in the sub-query.

20. The system of claim 16, wherein the categorizing logic, in the controller computer, is configure to review metadata on each computer to determine actions requiring expressions based on edge specific attributes and expressions based on attributes from more than one computer, wherein an action requiring both expressions is separated into two actions, wherein a propagation action is created for expressions based on edge specific attributes.

* * * * *